United States Patent [19]

Gerth et al.

[11] Patent Number: 4,996,267

[45] Date of Patent: Feb. 26, 1991

[54] HEAT-CURABLE RESIN MIXTURE OF MONOCYANATE, POLYCYANATE AND REACTIVE THERMOPLASTIC

[75] Inventors: Dale Gerth, Ludwigshafen, Fed. Rep. of Germany; Peter Ittemann, Fort Mill, S.C.; Helmut Tesch, Birkenheide, Fed. Rep. of Germany

[73] Assignee: BASF Aktiengesellschaft, Ludwigshafen, Fed. Rep. of Germany

[21] Appl. No.: 303,868

[22] Filed: Jan. 30, 1989

[51] Int. Cl.$^5$ .................. C08L 79/08; C08L 81/06
[52] U.S. Cl. .................. 525/423; 525/426; 525/436; 525/437; 525/438; 525/445; 525/463; 525/467; 525/471; 525/530; 525/533; 525/534; 525/535
[58] Field of Search ............... 525/423, 426, 436, 437, 525/438, 445, 463, 467, 471, 530, 533, 534, 535

[56] References Cited

U.S. PATENT DOCUMENTS

| | | | |
|---|---|---|---|
| 4,157,360 | 6/1979 | Prevorsek et al. | 526/60 |
| 4,195,132 | 3/1980 | Sundermann et al. | 525/471 |
| 4,330,658 | 5/1982 | Ikeguchi et al. | 525/436 |
| 4,389,516 | 1/1983 | Sugio et al. | 525/534 |
| 4,585,855 | 4/1986 | Gaku et al. | 525/426 |
| 4,717,609 | 1/1988 | Gaku et al. | 525/438 |
| 4,749,760 | 6/1988 | Wang | 525/534 |
| 4,785,075 | 11/1988 | Shimp | 525/467 |

FOREIGN PATENT DOCUMENTS 0230631 5/1987 European Pat. Off. .
1165451 12/1982 Japan .
27512362 3/1987 Japan .

OTHER PUBLICATIONS

Wertz et al., "Dicyanate Semi IPN", Polym. Eng. Sci., 25 (1985), pp. 804–806.
Nasa Report 3615, "Development of Tough Moisture Resisting Laminating Resins", R. A. Brand et al., 1982.

Primary Examiner—John Kight, III
Assistant Examiner—Frederick Krass
Attorney, Agent, or Firm—William G. Conger

[57] ABSTRACT

A heat-curable resin mixture comprises
(A) a polyfunctional aromatic cyanic ester,
(B) a monofunctional aromatic cyanic ester,
(C) a thermoplastic polymer,
(D) an optional bismaleimide,
(E) an optional epoxy resin.

1 Claim, No Drawings

HEAT-CURABLE RESIN MIXTURE OF MONOCYANATE, POLYCYANATE AND REACTIVE THERMOPLASTIC

The present invention relates to a heat-curable resin mixture based on cyanic esters and thermoplastic polymers which, on curing, give moldings of good toughness, stiffness and heat resistance.

Cyanic ester resins have good processing and curing properties, giving on curing moldings of good mechanical strength, chemical resistance and high glass transition temperatures but comparatively high brittleness. This is also true of epoxy resins. Of these it is known that the toughness can be improved by adding rubbery or thermoplastic polymers. Such additions have also already been proposed for cyanate resins.

JP-A-571165,451 describes mixtures of a cyanic ester and a hydroxyl-containing polyether sulfone. EP-A-230,631 relates to mixtures of a polyfunctional cyanic ester, a polyfunctional maleimide, an epoxy compound and a polyester. JP-A-275,123/62 describes mixtures of cyanate esters, epoxy resins and a polyether sulfone. According to U.S. Pat. No. 4,157,360 and a paper by D. H. Wertz and D. C. Prevorsek in Polym. Eng. Sci. 25 (1985), 804–806, semi-interpenetrating polymer networks are formed on curing mixtures of cyanic esters and thermoplastics. It has been found that although such an addition of thermoplastic does increase the toughness of moldings from cyanic ester resins, the stiffness, measured in terms of the modulus of elasticity, and in many cases the heat resistance as well decrease.

NASA Report 3615, Development of Tough, Moisture Resistant Laminating Resins, by R. A. Brand and E. S. Harrison, 1982, describes the improvement of the toughness and water resistance of cyanate resins by the addition of monocyanates. A further improvement in toughness can be obtained by admixing an amine-terminated butadiene/acrylonitrile rubber. However, this is at the expense of stiffness. It has also been found that this system in high-performance composite does not bring about a sufficient improvement in the resistance to compression after impact (the CAI value).

It is an object of the present invention to provide cyanic ester resins which on curing give moldings of improved toughness without reducing the stiffness and heat resistance. Fiber composites based on these cyanate resins should have high resistance to compression after impact.

We have found that this object is achieved by admixing mixtures of polyfunctional cyanic esters and thermoplastic polymers with monofunctional cyanic esters.

The present invention accordingly provides heat-curable resin mixtures containing (A) 100 parts by weight of a polyfunctional aromatic cyanic ester, (B) from 2 to 100 parts by weight of a monofunctional aromatic cyanic ester, (C) from 5 to 100 parts by weight of a thermoplastic polymer having a glass transition temperature above 100° C., (D) from 0 to 50 parts by weight of an optional bismaleimide, and (E) from 0 to 50 parts by weight of an optional epoxy resin.

Polyfunctional aromatic cyanic esters are known. Their cyclotrimerization and the properties of the cured polymers are described for example by R. Kubenz et al. in Kunststoffe 58 (1968), 827–832. They conform to the general formula $$R(O-C\equiv N)_n \qquad (I)$$

where n is an integer greater than or equal to 2 and R is n-valent aryl of preferably from 6 to 36 carbon atoms which may be interrupted by bridge members. Such bridge members are for example

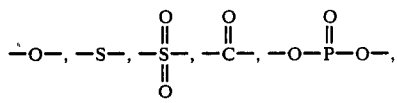

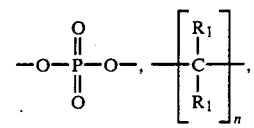

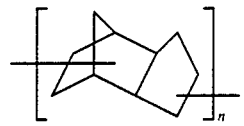

The following polyfunctional aromatic cyanic esters are mentioned as examples: 1,4-dicyanatobenzene, 1,3-dicyanatobenzene, dicyanatobisphenol A, dicyanatobisphenol F, 4,4'-dicyanatobiphenyl, 4,4'-dicyanatodiphenyl ether, 4,4'-dicyanatodiphenyl ketone, 4,4'-dicyanatodiphenyl sulfone,

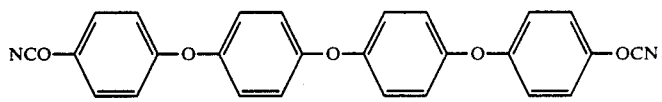

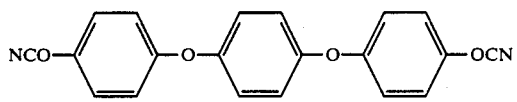

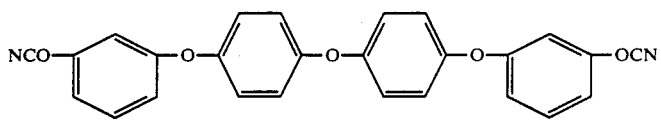

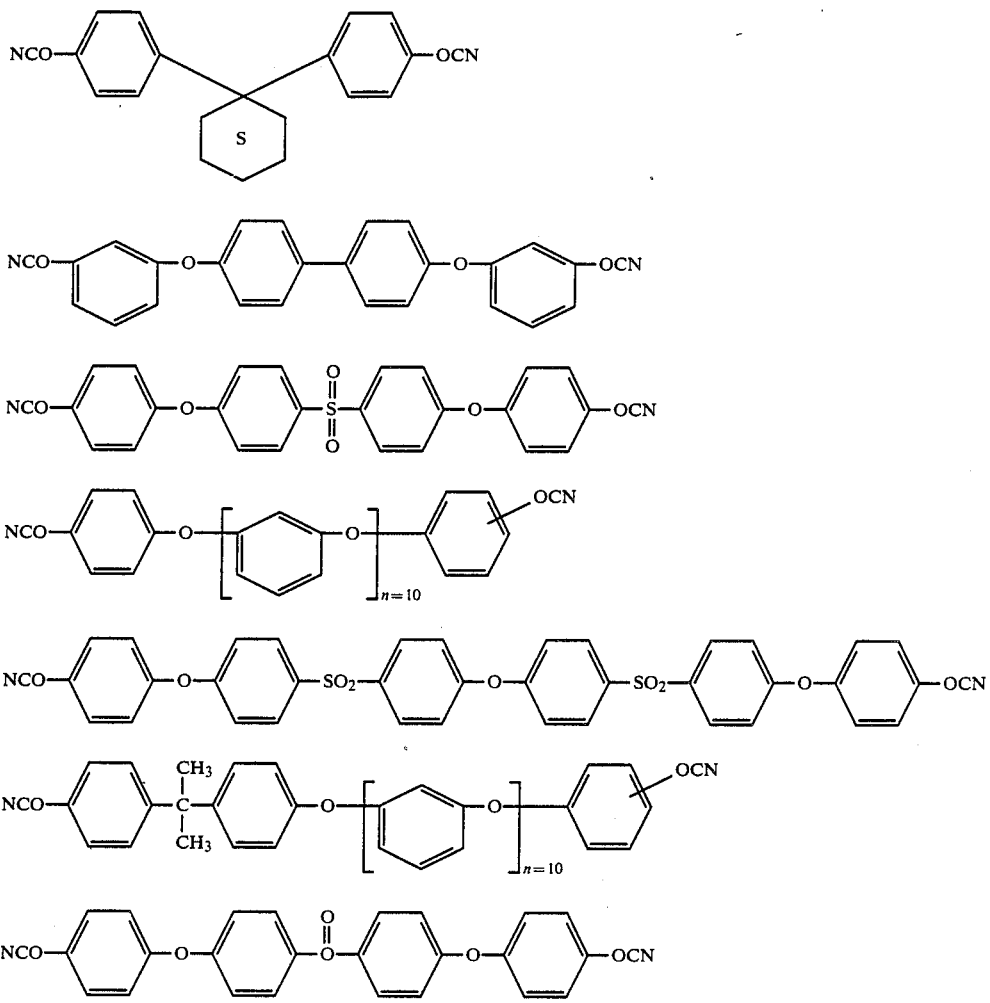

Monofunctional aromatic cyanic esters are likewise known. They conform to the formula

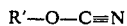

where R' is monovalent aryl of preferably from 6 to 12 carbon atoms which may be substituted, for example by halogen, alkyl or hydroxyl. In R' too the carbon chain may be interrupted by the abovementioned bridge members. The monocyanates B are present in the resin mixture in amounts of from 2 to 100, preferably of from 5 to 50, parts by weight, based on 100 parts by weight of A.

The following monofunctional aromatic cyanic esters are mentioned as examples: 4-cyanatobiphenyl, cyanatobenzene, 1-cyanatonaphthalene, 2-cyanatonaphthalene, 4-cyanatononylphenol, 4-chlorocyanatobenzene, 4-cyanatodiphenyl sulfone, 4-cyanatotoluene, 4-cyanatodiphenyl ether and 4-cyanatodiphenyl ketone.

Suitable heat-resistant thermoplastic polymers C are for example polyimides, polyether ketones, polyether ether ketones, polysulfones, polyether sulfones, polycarbonates, polyarylates and polyether imides. Their molecular weight can be within the range from 2,000 to 200,000. Preference is given to thermoplastics having an average molecular weight $M_n$ of from 3,000 to 30,000, in particular of from 5,000 to 20,000, which contain reactive end groups, for example phenolic hydroxyl, amino, carboxyl or isocyanato groups. These reactive end groups react with the cyanate groups of components A and 8 and thereby establish a bond from the thermoplastic to the resin matrix.

The thermoplastics C are present in the resin mixture in amounts of from 5 to 100, preferably of from 10 to 50, parts by weight, based on 100 parts by weight of A.

Particularly preferred thermoplastics are hydroxyl-terminated polysulfones and polyether sulfones. The preparation of these oligomers from bifunctional phenols and dichlorodiphenyl sulfone is described for example in Polymer Preprint 23 (1982), 284. The following bifunctional phenols are mentioned as examples: bisphenol A, bisphenol F, 4,4'-dihydroxydiphenyl sulfone, 1,6-dihydroxynaphthalene, 2,7-dihydroxynaphthalene and 4,4'-dihydroxybiphenyl.

It is also possible to use mixtures of the heat-resistant thermoplastics C with other thermoplastics, for example polyesters.

The bismaleimides D conform to the formula

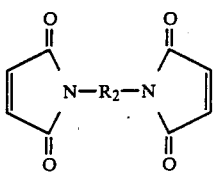

(III)

where $R_2$ is an aromatic or aliphatic radical. Bismaleimides are prepared in a conventional manner from maleic anhydride and diamines. Preference is given to aromatic diamines, but if a certain flexibility is demanded it is also possible to use aliphatic diamines alone or combined with aromatic diamines. The following diamines are mentioned by way of example: m-phenylenediamine, p-phenylenediamine, 4,4'-diaminodiphenyl sulfone, 3,3'-diaminodiphenyl sulfone, 4,4'-diaminodiphenylmethane, 4,4'-diaminodiphenyl ether and the like. Bismaleimides serve to improve the heat resistance and solvent resistance of the cured moldings.

If desired, it is also possible to use a prepolymer from the polyfunctional cyanic ester A and the bismaleimide D.

The epoxy resins E may comprise known polyglycidyl ethers of dipehnylolalkanes and polyhydric phenols, such as novolaks, cresols and resols. Preference is given to diglycidyl ethers of bisphenol A and bisphenol F. The addition of epoxy resins improves the solvent resistance.

The resin mixture may be cured in the presence of from 0 to 3% by weight of a trimerization promoting catalyst. These may comprise acids, bases, salts, phenols and phosphorus compounds, for example Lewis acids ($AlCl_3$, $BF_3$, $FeCl_3$, $TiCl_4$), protonic acids (HCl, $H_3PO_4$), sodium hydroxide, triethylamine, tributylphosphine and the like.

Preference is given to transition metal-containing catalysts, for example cobalt naphthenate, copper naphthenate, zinc octoate, cobalt acetylacetonate and zinc acetylacetonate, with or without a proton donor such as nonylphenol.

The resin may be mixed in solution. To this end, the components are dissolved in a solvent, for example methylene chloride or acetone. The solvent is removed under reduced pressure, and the resulting mixture is melted at 100–180° C. This mixture is either admixed with a catalyst at 80–140° C. or prereacted to a certain viscosity by heating to 100–200° C. and the resulting prepolymer is then admixed with catalyst. However, it is preferable to mix the components in the melt and then with or without prior reaction to mix in the trimerization catalyst. It is advantageous here that the addition of the monocyanate has the effect of reducing the viscosity of the resin mixture.

The resin mixture is cured at from 120° to 200° C. for from 30 to 720 minutes and where appropriate aftercured at from 200° to 250° C. for from 30 to 720 minutes.

The resins according to the invention are usable as impregnating, casting and laminating resins and also as molding compositions (filled or unfilled).

If they are used to manufacture high-performance composites, the impregnation of glass, carbon or aramid fibers from unidirectional prepregs, woven prepregs or rovings preferably takes place from the melt at 50°–150° C. At 100° C. the resin mixture here should advantageously have a viscosity of from 1,500 to 10,000, preferably of from 2,000 to 5,000, mPas.

A further increase in the toughness of high-performance composites can be achieved by incorporating particles of highly heat-resistant thermoplastics between the prepreg layers.

High-performance composites from the resin mixtures according to the invention may be used in aerospace and also for selected automotive parts. Owing to their high toughness, stiffness and glass transition temperatures, they are particularly highly suitable for aircraft construction. These properties in conjunction with their low dielectric constants permit their use for electronic components, for example circuit boards.

The cured molding properties reported in the Examples are measured as follows:

Glass transition temperature Tg: in accordance with German Standard Specification DIN 55445

Modulus of elasticity E: determined from the relationship between the crack opening and modulus of elasticity reported by Saxena and Hudak in Int. J. Fracture 14, 453–467

Fracture energy $G_{ic}$: determined from the relationship $G_{ic} = K_{ic}^2/E$ where the stress intensity factor $K_{ic}$ is determined in accordance with ASTM Metal Standard E 399 Resistance to compression after impact (CAI): determined according to Boeing test BSS 7260 on 32-ply quasiisotropic $[-45°, 0°, -45°, 90°]_{4s}$ laminates after an impact stress of 6.7 joule/mm.

EXAMPLE 1

Dicyanatobisphenol A (350 g) and 4-cyanatobiphenyl (50 g) are heated to 110° C. 100 g of a polysulfone having an average molecular weight $\overline{M}_n$ of 12,000, prepared from 4,4'-dichlorodiphenyl sulfone and bisphenol A, are slowly added. The mixture is devolatilized and stirred at 120° C. until the polysulfone has dissolved. The resin is cooled down to 100° C., and a catalyst mixture of 0.93 g of nonylphenol and 0.31 g of copper naphthenate is added. The mixture is stirred for 10 minutes, and the resin is poured into a 4 mm×25 cm×25 cm metal mold. The resin is cured at 120° C. for 2 hours, at 180° C. for 2 hours and at 210° C. for 4 hours. Samples are tested. The results are shown in the table.

EXAMPLE 2

Example 1 is repeated using 300 g of dicyanatobisphenol A, 100 g of 4-cyanatobiphenyl and 100 g of the hydroxyl terminated polysulfone of Example 1.

EXAMPLE 3 comparison

Oicyanatobisphenol A (320 g) is heated to 110° C., and the hydroxyl terminated polysulfone (80 g) of Example 1 is added. The mixture is stirred until the polysulfone dissolves. The mixture is cooled down to 100° C., and 0.8 g of a catalyst mixture of 0.5 g of copper naphthenate and 1.5 g of nonylphenol is added. The resin is stirred under reduced pressure for 5 minutes and is then poured into a 4 mm×25 cm×25 cm metal mold. The resin is cured at 120° C. for 2 hours, at 180° C. for 2 hours and at 210° C. for 4 hours. Test results are shown in the table.

EXAMPLE 4
comparison

Example 3 is repeated using 300 g of dicyanatobisphenol A and 100 g of hydroxyl terminated polysulfone of Example 1.

EXAMPLE 5
comparison

Dicyanatobisphenol A (320 g) and 4-cyanatobiphenyl (80 g) are heated to 100° C. The mixture is devolatilized for 10 minutes, and 0.25 g of copper naphthenate and 0.75 g of nonylphenol are added. The resin is poured into a 4 mm×25 cm×25 cm metal mold and cured at 120° C. for 2 hours, 180° C. for 2 hours and 210° C. for 4 hours.

EXAMPLE 6
comparison

Example 5 is repeated using 300 g of dicyanatobisphenol A and 100 g of 4-cyanatobiphenyl.

EXAMPLE 7
comparison

Example 6 is repeated with 400 g of dicyanatobisphenol A.

TABLE

| Example | Glass transition temperature Tg (tan δ) | | Modulus of elasticity [N/mm$^2$] | Fracture energy G$_{ic}$ [J/m$^2$] |
| --- | --- | --- | --- | --- |
| 1 | 280° C. | (209° C.*) | 4217 | 301 |
| 2 | 246° C. | (206° C.*) | 4237 | 363 |
| 3 | 271° C. | (208° C.*) | 4160 | 243 |
| 4 | 264° C. | (205° C.*) | 4181 | 236 |
| 5 | 246° C. | | 4168 | 153 |
| 6 | 243° C. | | 4166 | 184 |
| 7 | 290° C. | | 4092 | 148 |

*shoulder

EXAMPLE 8
prepreg making 1,200 g of dicyanatobisphenol A, 400 g of 4-cyanatobiphenyl and 400 g of the hydroxyl terminated polysulfone of Example 1 are stirred at 110° C. until a viscosity of 2800 mPas (measured at 100° C.) is obtained. The mixture is cooled down to 100° C., and a catalyst mixture of 1.875 g of nonylphenol and 0.625 g of cobalt naphthenate is added. On a film coater the mixture is used to produce films having a basis weight of 70 g/m$^2$. These films are pressmolded together with unidirectional carbon fibers (IM-7 from Hercules) at 120° C. under 2 bar to give a prepreg having a fiber content of 67% by weight. 32 such prepregs are pressmolded together in accordance with the Boeing test to give a laminate which is cured at 180° C./5 bar for 2 hours and aftercured at 210° C. for 4 hours. The test specimens obtained have their CAI values measured.

EXAMPLE 9
comparison

Example 8 is repeated using 2,000 g of dicyanatobisphenol A, except that stirring is carried out at 150° C. until the viscosity of 2800 mPas (100° C.) is obtained.

| RESULTS | |
| --- | --- |
| Example | CAI value |
| 8 | 261 mPa |
| 9 | 185 mPa |

We claim:
1. A heat-curable resin mixture containing
   (A) 100 parts by weight of a polyfunctional aromatic cyanic ester,
   (B) from 2 to 100 parts by weight of a monofunctional aromatic cyanic ester,
   (C) from 5 to 100 parts by weight of a hydroxyl terminated polysulfone or polyether sulfone thermoplastic having an average molecular weight Mn of from 5,000 to 20,000; polymer having a glass transition temperature above 100° C.,
   (D) from 0 to 50 parts by weight of an optional bismaleimide, and
   (E) from 0 to 50 parts by weight of an optional epoxy resin.

* * * * *